(12) United States Patent
Segawa

(10) Patent No.: US 12,222,023 B2
(45) Date of Patent: Feb. 11, 2025

(54) BALL SCREW DEVICE AND MANUFACTURING METHOD OF SCREW SHAFT

(71) Applicant: NSK LTD., Tokyo (JP)

(72) Inventor: Ryo Segawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/290,108

(22) PCT Filed: Dec. 12, 2022

(86) PCT No.: PCT/JP2022/045691
§ 371 (c)(1),
(2) Date: Nov. 9, 2023

(87) PCT Pub. No.: WO2023/132190
PCT Pub. Date: Jul. 13, 2023

(65) Prior Publication Data
US 2024/0376969 A1    Nov. 14, 2024

(30) Foreign Application Priority Data
Jan. 5, 2022 (JP) .................... 2022-000588

(51) Int. Cl.
*F16H 25/22* (2006.01)
*F16H 25/20* (2006.01)
*F16H 25/24* (2006.01)

(52) U.S. Cl.
CPC . *F16H 25/2214* (2013.01); *F16H 2025/2087* (2013.01); *F16H 2025/2481* (2013.01)

(58) Field of Classification Search
CPC ......... F16H 25/2214; F16H 2025/2087; F16H 2025/2481
See application file for complete search history.

(56) References Cited

U.S. PATENT DOCUMENTS 6,907,967 B1 *   6/2005   Kapaan .................... H02K 7/06
                                                            188/162
2009/0260463 A1  10/2009  Fukano et al.
(Continued)

FOREIGN PATENT DOCUMENTS

JP       07-096341 A      4/1995
JP     2008-281142 A     11/2008
(Continued)

OTHER PUBLICATIONS

International Search Report for PCT/JP2022/045691 dated Feb. 21, 2023.

*Primary Examiner* — Terence Boes
(74) *Attorney, Agent, or Firm* — Sughrue Mion, PLLC

(57) ABSTRACT

A ball screw device has a screw shaft that has a screw portion having a spiral-shaped shaft-side ball screw groove on an outer peripheral surface thereof, and a carrier integrally formed with the screw portion and constituting a planetary speed-reducing mechanism; a nut that has a spiral-shaped nut-side bass screw portion on an inner peripheral surface thereof; a plurality of balls arranged between the shaft-side ball screw groove and the nut-side ball screw groove; and a rolling bearing for supporting the carrier which has an outer ring having an outer ring raceway, an inner ring raceway provided on a portion facing the outer ring raceway in a radial direction, and a plurality of rolling bodies arranged between the outer ring raceway and the inner ring raceway, which is directly formed on an outer peripheral surface of the carrier.

13 Claims, 12 Drawing Sheets

(56) References Cited

U.S. PATENT DOCUMENTS

2012/0111141 A1  5/2012 Shibutani et al.
2018/0345934 A1  12/2018 Weh et al.

FOREIGN PATENT DOCUMENTS

| JP | 2009-275914 A | 11/2009 |
| JP | 2009-286137 A | 12/2009 |
| JP | 2011-027154 A | 2/2011 |
| JP | 2016-148374 A | 8/2016 |
| JP | 2018-194080 A | 12/2018 |

* cited by examiner

BALL SCREW DEVICE AND MANUFACTURING METHOD OF SCREW SHAFT

This Application is a National Stage of International Application No. PCT/JP2022/045691 filed Dec. 12, 2022, claiming priority based on Japanese Patent Application No. 2022-000588 filed Jan. 5, 2022.

TECHNICAL FIELD

The present disclosure relates to a ball screw device and a manufacturing method of a screw shaft of the ball screw device.

BACKGROUND OF INVENTION

In a ball screw device, balls are rolled and moved between a screw shaft and a nut, and thus higher efficiency may be obtained compared to a slide screw device in which there is direct contact between the screw shaft and the nut. For this reason, ball screw devices are incorporated in various kinds of mechanical devices such as electric brake devices or automatic manual transmissions (AMT) of automobiles, positioning devices of machine tools, and the like, in order to convert rotational motion of a drive source such as an electric motor into linear motion.

A ball screw device has a screw shaft having a spiral-shaped shaft-side ball screw groove on an outer peripheral surface thereof, a nut having a spiral-shaped nut-side ball screw groove on an inner peripheral surface thereof, and balls arranged between the shaft-side ball screw groove and the nut-side ball screw groove. In a ball screw device, depending on the application, one of the screw shaft and the nut is used as a rotational motion element, and the other of the screw shaft and the nut is used as a linear motion element.

FIG. 11 illustrates a conventional structure of a ball screw device 100 as described in JP 2009-286137 A.

The ball screw device 100 includes a screw shaft 101, a nut 102, and a plurality of balls (not illustrated).

The screw shaft 101 has a screw portion 103 and a fitting shaft portion 104 adjacently arranged on one side in the axial direction side of the screw portion 103. On the outer peripheral surface of the screw portion 103, a shaft-side ball screw groove 105 having a spiral shape is formed. The fitting shaft portion 104 has an outer diameter smaller than that of the screw portion 103. The screw shaft 101, in a state in which the screw portion 103 is inserted inside the nut 102, is arranged coaxially with the nut 102.

The nut 102 has a cylindrical shape. On the inner peripheral surface of the nut 102, a spiral-shaped nut-side ball screw groove (not illustrated) is formed. The nut 102 engages with a plurality of guide rods 107 supported with respect to the housing 106. This prevents the nut 102 from rotating.

The shaft-side ball screw groove 105 and the nut-side ball screw groove are arranged so as to face each other in a radial direction, forming a spiral-shaped load path. A start point and an end point of the load path are connected by a circulation means (not illustrated). Therefore, the balls that have reached the end point of the load path are returned to the start point of the load path through the circulation means. Note that the start point and end point of the load path are interchanged according to the relative displacement direction in the axial direction (relative rotation direction) between the screw shaft 101 and the nut 102.

In the ball screw device 100, the rotation of an electric motor 108, which is a drive source, is reduced by a pulley device 109 and transmitted to the screw shaft 101. For this reason, a driven pulley 110 is fitted on a fitting shaft portion 104 provided at an end portion on the one side in an axial direction of the screw shaft 101 so as not to be able to relatively rotate.

Further, a drive pulley 112 is fitted on a tip end portion of a motor shaft 111 of the electric motor 108 so as not to be able to relatively rotate. Furthermore, a belt 113 is stretched between the drive pulley 112 and the driven pulley 110. As a result, the rotation of the electric motor 108 is decreased and transmitted to the screw shaft 101.

CITATION LIST

Patent Literature

Patent Literature 1: JP 2009-286137 A

SUMMARY

Problem to be Solved

In order to transmit the rotation of the electric motor to the screw shaft of the ball screw device, it is considered to use a pulley device as used in the conventional structure described in JP 2009-286137 A, or a spur gear type speed-reducing mechanism.

The inventors of the present disclosure investigated the use of a planetary speed-reducing mechanism, which has advantages such as coaxial arrangement of the input shaft and output shaft and reduction in size of the device, compared to a pulley device or a spur gear type speed-reducing mechanism, for transmitting the rotation of the electric motor to the screw shaft of the ball screw device. FIG. 12 illustrates an undisclosed ball screw device that the inventors of the present disclosure conceived prior to completing the ball screw device of the present disclosure.

In this ball screw device, a carrier 115 of the planetary speed-reducing mechanism 114 is fitted on an end portion on one side in the axial direction of the screw shaft 101a of the ball screw device 100a so as not to be able to relatively rotate. Specifically, a fitting shaft portion 104a formed at the end portion on the one side in the axial direction of the screw shaft 101a is spline-fitted into a mounting hole 116 formed in a central portion in the radial direction of the carrier 115.

Further, a plurality of planetary gears 117 is supported so as to be able to rotate freely with respect to the carrier 115. Specifically, pinion pins 119 are inserted through and supported by a plurality of support holes 118 formed in the intermediate portion in the radial direction of the carrier 115 to support the planetary gears 117 around the pinion pins 119 so as to be able to rotate freely. Further, a sun gear 120 is fixed at a tip end portion of a motor shaft 111a of an electric motor 108a and a ring gear 121 is arranged coaxially with the sun gear 120 and fixed to a housing 124, and the plurality of planetary gears 117 is disposed between the sun gear 120 and the ring gear 121. The plurality of planetary gears 117 engages with the sun gear 120 and the ring gear 121 respectively.

In this ball screw device, when the electric motor 108a is energized to rotate the sun gear 120, the planetary gears 117 revolve around the sun gear 120 while rotating. Then, the revolving motion of the planetary gears 117 is transmitted to the screw shaft 101a through the carrier 115 to rotationally drive the screw shaft 101a.

Further, the carrier 115 fixed to the fitting shaft portion 104a of the screw shaft 101a is supported by using a rolling bearing 122 so as to be able to rotate freely with respect to the housing 124. As a result, the axial force transmitted to the carrier 115 is supported by the housing 124 through the rolling bearing 122.

With such a structure, when the screw shaft 101a is rotationally driven, an axial reaction force acting on the screw shaft 101a from a nut 102a through the balls is prevented from being transmitted to an engaging portion between the planetary gears 117 and the sun gear 120 and an engaging portion between the planetary gears 117 and the ring gear 121. Further, even if an axial force acts on the carrier 115 due to the fact that helical gears are used as the planetary gears 117 for reasons such as securing performance reducing noise and vibration, since the rolling bearing 122 is provided, it is possible to prevent the axial force from being transmitted to rolling contact portions between the balls and the shaft-side ball screw groove 105a and the nut-side ball screw groove 125.

In this ball screw device, in order to efficiently transmit the axial force from the carrier 115 to the rolling bearing 122, an outward flange portion 123 is provided in a portion on the outer peripheral surface of the carrier 115 so as to bring the flange portion 123 into contact with the rolling bearing 122.

In this ball screw device, since the carrier 115 is supported so as to be able to rotate freely with respect to the housing 124 by using the rolling bearing 122 which is separate from the carrier 115, the number of components increases, and the assembling efficiency of the ball screw device 100a may easily deteriorate.

An object of the present disclosure is to provide a ball screw device in which the number of components can be suppressed and the assembling efficiency can be improved even when adopting a structure that rotationally drives a screw shaft using a planetary speed-reducing mechanism.

Solution to Problem

A ball screw device according to an aspect of the present disclosure includes a screw shaft, a nut, a plurality of balls, and a rolling bearing.

The screw shaft has a screw portion having a shaft-side ball screw groove having a spiral shape on an outer peripheral surface thereof; and a carrier constituting a planetary speed-reducing mechanism which is integrally configured with the screw portion and arranged on one side in an axial direction of the screw portion, and undergoes rotational motion during use.

The nut has a nut-side ball screw groove having a spiral shape on an inner peripheral surface thereof, and undergoes linear motion during use.

The plurality of balls is arranged between the shaft-side ball screw groove and the nut-side ball screw groove.

The rolling bearing has an outer ring having an outer ring raceway on an inner peripheral surface thereof, an inner ring raceway provided on a portion facing the outer ring raceway in a radial direction, and a plurality of rolling bodies arranged between the outer ring raceway and the inner ring raceway so as to be able to roll freely, and supports the carrier so as to be able to rotate freely.

In the ball screw device according to an aspect of the present disclosure, the inner ring raceway is directly formed on an outer peripheral surface of the carrier. In other words, an inner ring, which constitutes the rolling bearing and has the inner ring raceway, is configured integrally with the carrier.

In the ball screw device according to an aspect of the present disclosure, the screw portion may have an incomplete screw portion at an end portion on one side in the axial direction of the outer peripheral surface thereof.

In this case, the distance from an end portion on the one side in the axial direction of the nut-side ball screw groove to a side surface on the one side in the axial direction of the nut can be greater than the distance from a boundary between the incomplete screw portion and the shaft-side ball screw groove to a side surface on the other side in the axial direction of the carrier.

In the ball screw device according to an aspect of the present disclosure, the screw portion may have a tapered concave portion of which a generatrix shape is inclined in a direction in which an outer diameter thereof decreases as going toward the one side in the axial direction at an end portion on the one side in the axial direction of the outer peripheral surface.

In the ball screw device according to an aspect of the present disclosure, a side surface on the one side in the axial direction of the outer ring can be offset from a side surface on the one side in the axial direction of the carrier toward the other side in the axial direction. That is, the side surface on the one side in the axial direction of the outer ring can be arranged parallel to the side surface on the one side in the axial direction of the carrier, and can be located on the other side in the axial direction from the side surface on the one side in the axial direction of the carrier.

In the ball screw device according to an aspect of the present disclosure, a width dimension in the axial direction of the carrier can be made larger than a width dimension in the axial direction of the outer ring.

In the ball screw device according to an aspect of the present disclosure, the carrier may have support holes at a plurality of locations in a circumferential direction of an intermediate portion in the radial direction thereof for inserting and supporting pinion pins constituting the planetary speed-reducing mechanism.

In this case, the support holes can be configured by through holes that penetrate the carrier in the axial direction. Alternatively, the support holes can also be configured by bottomed holes that open only on a side surface on the one side in the axial direction of the carrier.

In the ball screw device according to an aspect of the present disclosure, the carrier may have a projecting portion that protrudes toward the one side in the axial direction in portion of the side surface on the one side in the axial direction thereof including opening portions of the support holes.

In this case, the projecting portion may have an annular shape. Alternatively, the projecting portion may be provided only around the opening portions of the support holes.

A manufacturing method of the screw shaft according to an aspect of the present disclosure is a method for manufacturing a screw shaft and includes a forging process and a rolling process, wherein the screw shaft undergoes rotational motion during use and has a screw portion and a carrier, which is integrally configured with the screw portion, constituting the planetary speed-reducing mechanism arranged on one side in an axial direction of the screw portion. The screw portion has a shaft-side ball screw groove having a spiral shape on an outer peripheral surface thereof, and the carrier has an inner ring raceway constituting a rolling bearing directly formed on an outer peripheral surface thereof.

In the forging process, an intermediate material integrally comprising a disk portion and a shaft-shaped portion and having a T-shaped cross-sectional shape with respect to the axial direction is formed by performing a forging process to a raw material.

In the rolling process, the shaft-side ball screw groove is formed on an outer peripheral surface of the shaft-shaped portion by performing an infeed rolling process to the intermediate material.

The manufacturing method of the screw shaft according to an aspect of the present disclosure may include a raceway groove cutting process to form the inner ring raceway by performing a cutting process on an outer peripheral surface of the disk portion.

In the manufacturing method of the screw shaft according to an aspect of the present disclosure, after the forging process and before the rolling process, a carrier-side center hole can be formed on a side surface on the one side in the axial direction of the disk portion and a screw-side center hole can be formed on a side surface on the other side in the axial direction of the shaft-shaped portion so as to be coaxial with the carrier-side center hole.

In the manufacturing method of the screw shaft according to an aspect of the present disclosure, the rolling process and the cutting process can be performed in a state where the intermediate material is centered by using the carrier-side center hole and the screw-side center hole.

In the manufacturing method of the screw shaft according to an aspect of the present disclosure, after the rolling process, a heat-treated hardened layer can be formed in a range including the outer peripheral surface of the disk portion and the outer peripheral surface of the shaft-shaped portion, and support holes for inserting and supporting the pinion pins constituting the planetary speed-reducing mechanism can be subsequently formed in a circumferential direction of the intermediate portion in a radial direction of the disk portion in a state where the intermediate material is centered by using the carrier-side center hole and the screw-side center hole at a plurality of locations.

In the manufacturing method of the screw shaft according to an aspect of the present disclosure, after the forging process and before the rolling process, a small-diameter portion can be formed at an end portion on the one side in the axial direction of the shaft-shaped portion, the small diameter portion having an outer diameter smaller than an outer diameter of a portion of the shaft-shaped portion deviating from the end portion on the one side in the axial direction thereof.

Advantageous Effect

In the ball screw device according to an aspect of the present disclosure, alternatively, in a ball screw device using a screw shaft manufactured by the manufacturing method of the screw shaft according to an aspect of the present disclosure, although a structure in which a screw shaft is rotationally driven through a planetary speed-reducing mechanism is adopted, the number of components is suppressed, and the assembling efficiency is improved.

BRIEF DESCRIPTIONS OF THE DRAWINGS

FIG. 4(A) to FIG. 4(E) illustrate a manufacturing method of the screw shaft of the first example in order of steps.

Figure 5:
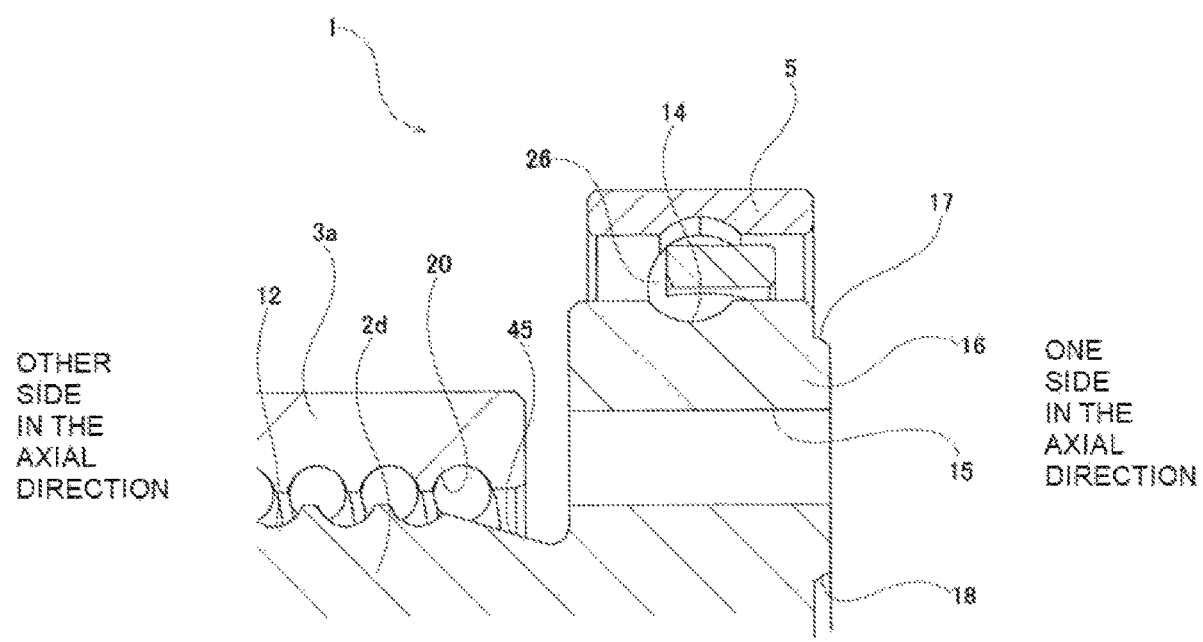

FIG. 5 is a partial enlarged cross-sectional view of the ball screw device of a second example of an embodiment of the present disclosure.

Figure 6:
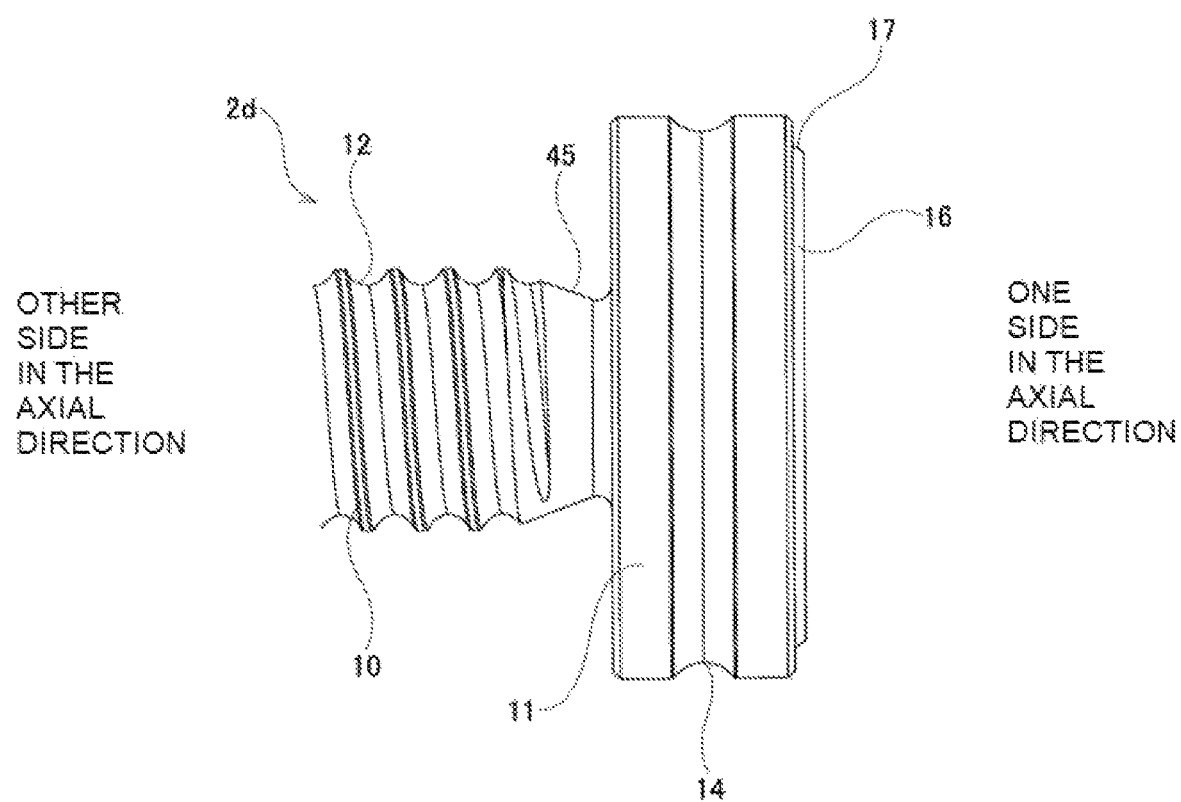

FIG. 6 is a partial enlarged view of the screw shaft of the ball screw device of the second example.

Figure 1:
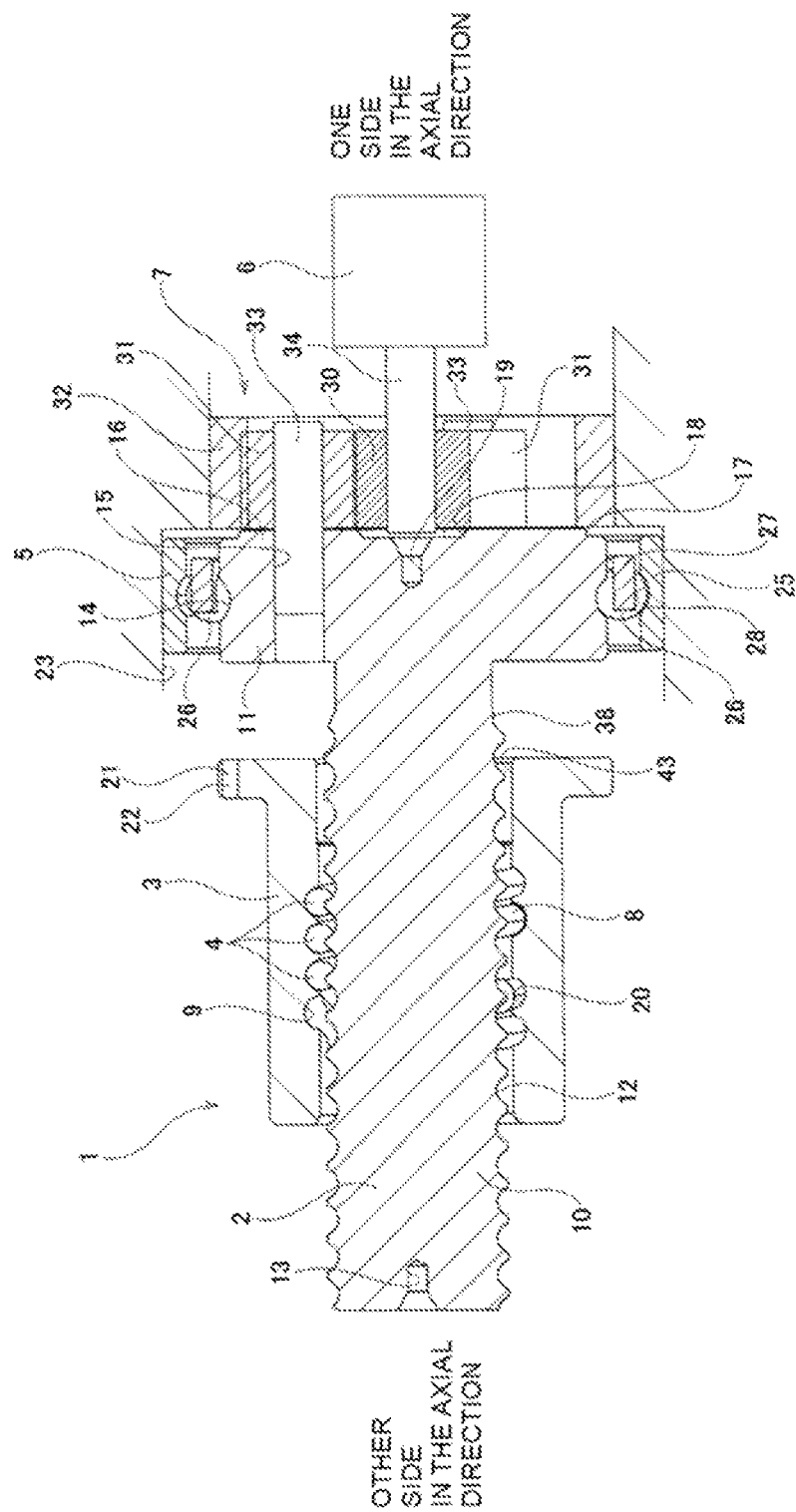
FIG. 1 is a cross-sectional view illustrating an example of a structure in which a ball screw device of a first example an embodiment of the present disclosure and a planetary speed-reducing mechanism are combined.
Figure 2:
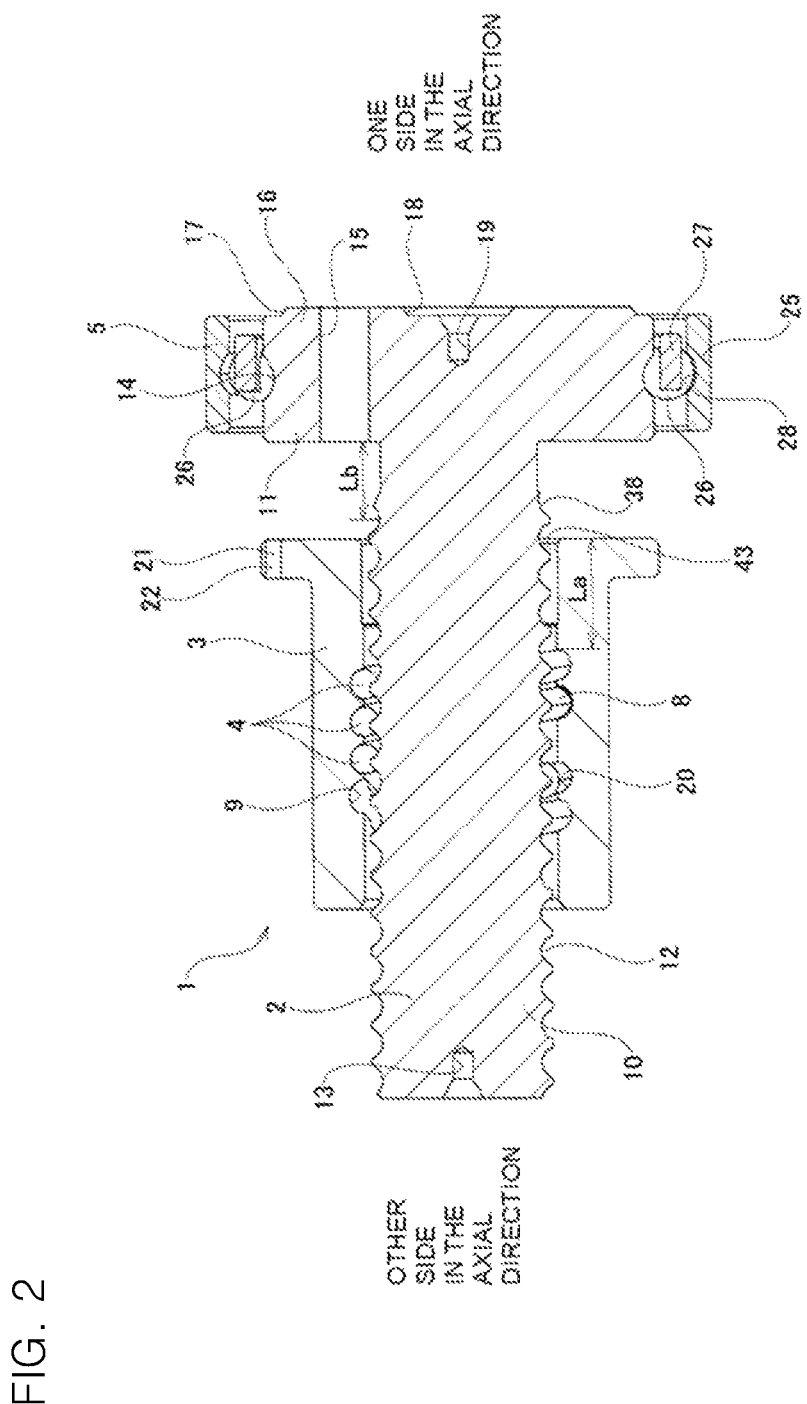
FIG. 2 is a cross-sectional view illustrating a ball screw device of the first example.
Figure 7:
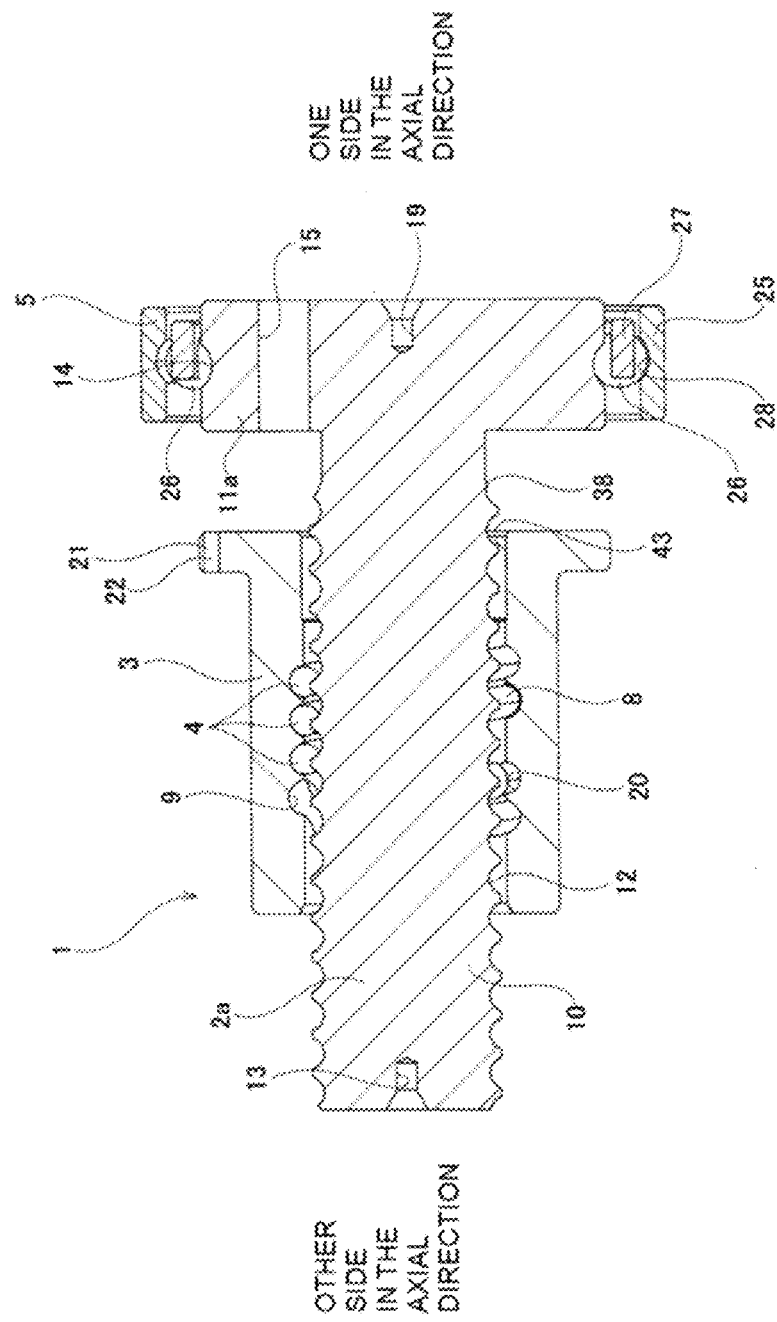

FIG. 7 is a view corresponding to FIG. 2 and illustrates a ball screw device of a third example of an embodiment of the present disclosure.

Figure 8:
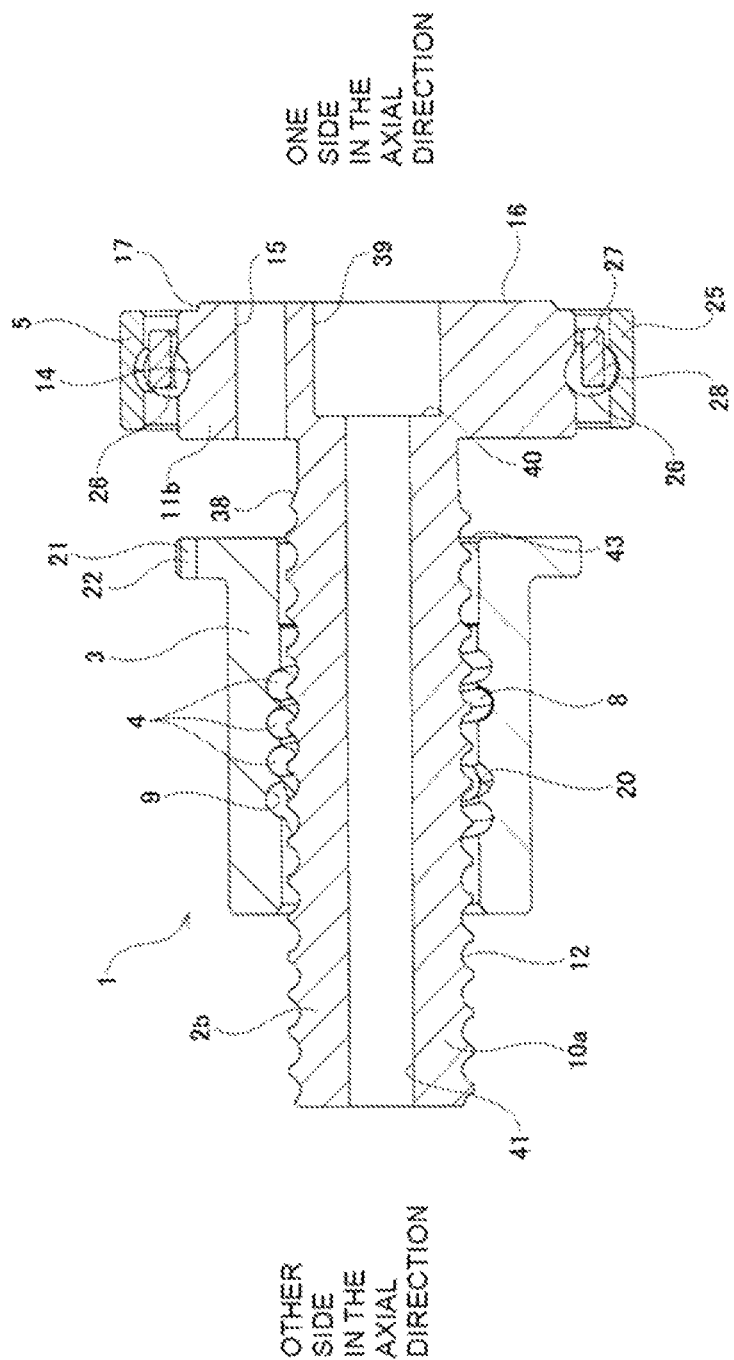

FIG. 8 is a view corresponding to FIG. 2 and illustrates a ball screw device of a fourth example of an embodiment of the present disclosure.

Figure 9:
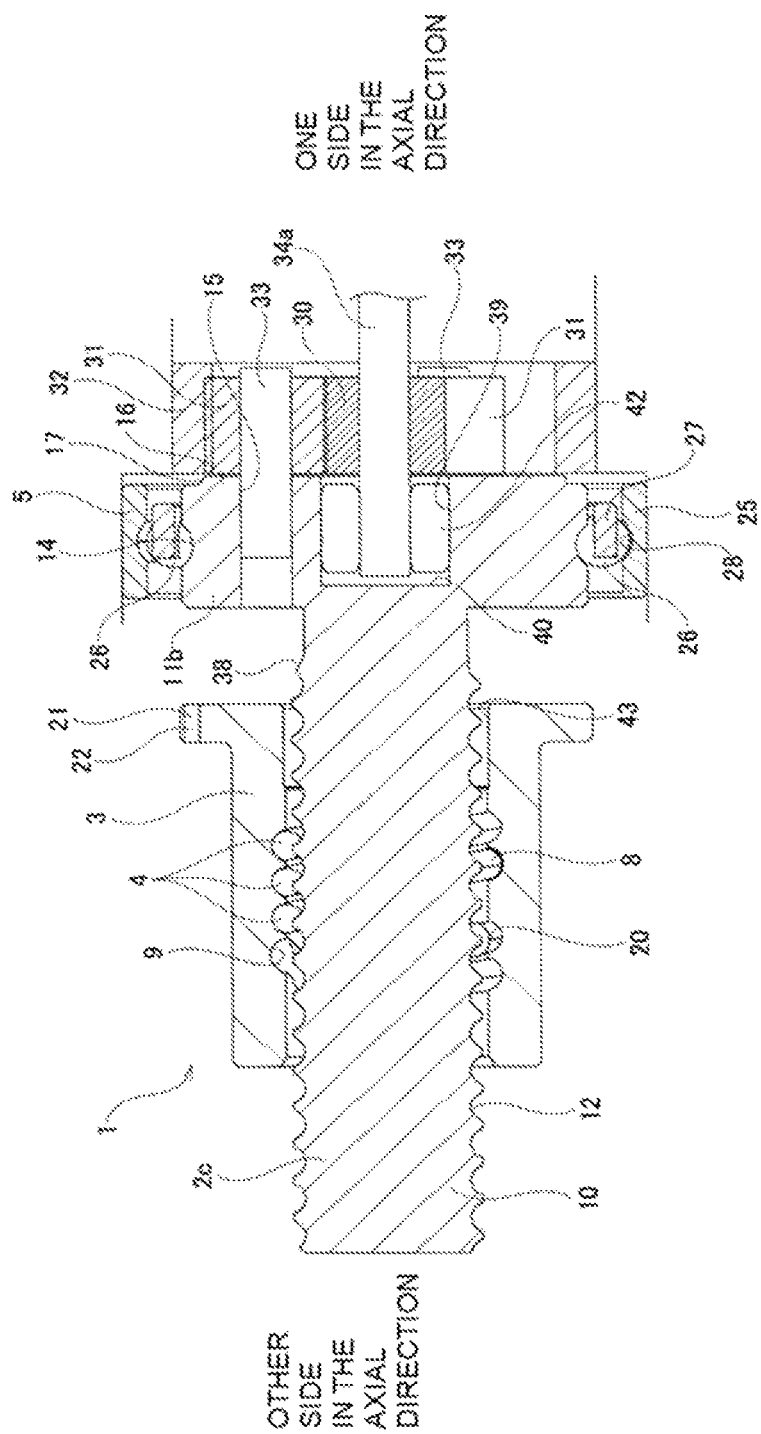

FIG. 9 is a cross-sectional view illustrating an example of a structure in which a ball screw device of a fifth example of an embodiment of the present disclosure and a planetary speed-reducing mechanism are combined.

Figure 10:
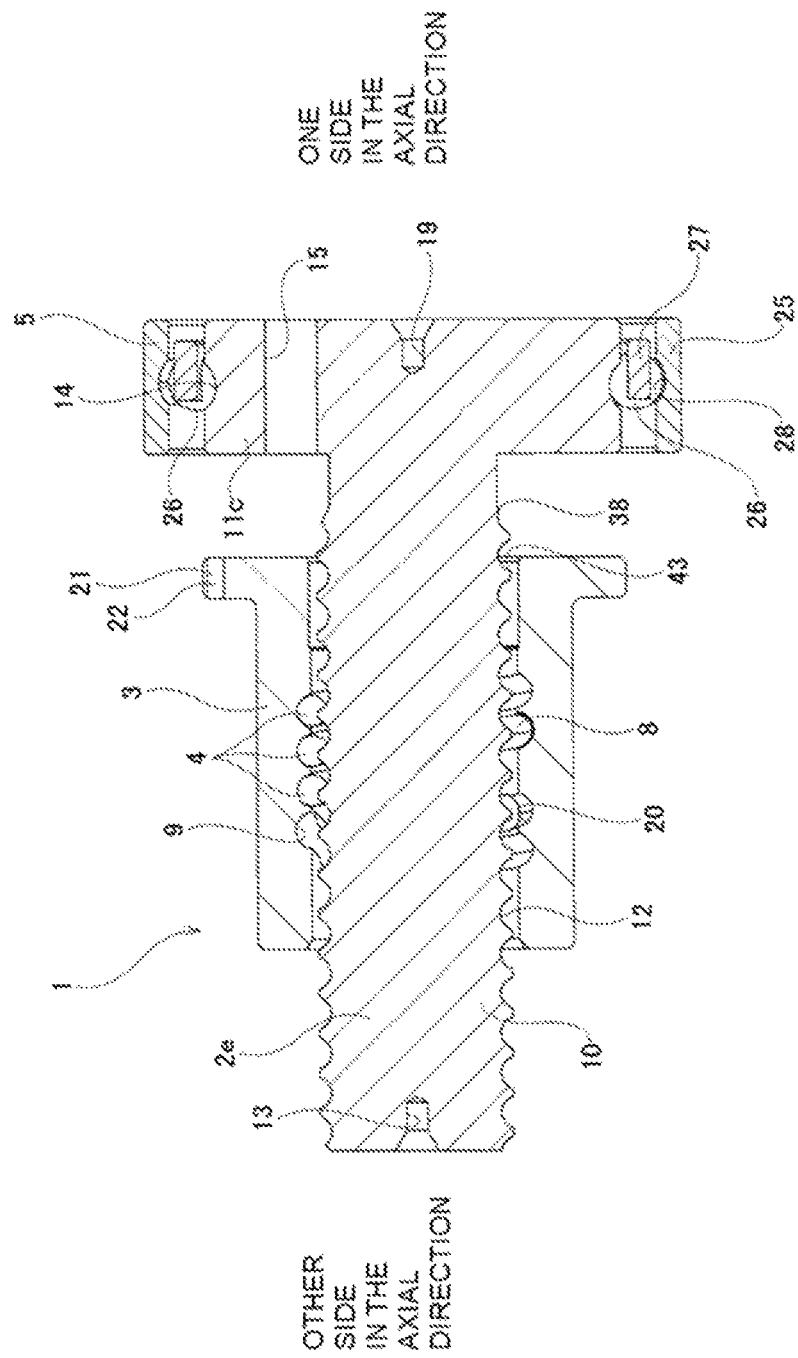

FIG. 10 is a view corresponding to FIG. 2 and illustrates a ball screw device of a sixth example of an embodiment of the present disclosure.

Figure 11:
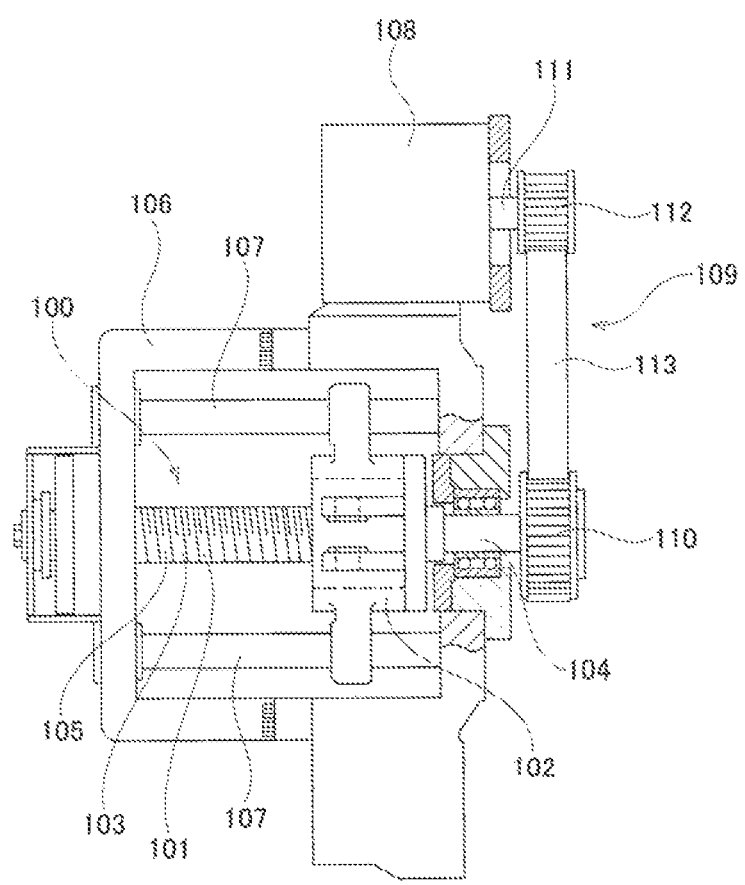

FIG. 11 is a cross-sectional view illustrating a conventional structure of a ball screw device in which a ball screw device and a pulley device are combined.

Figure 12:
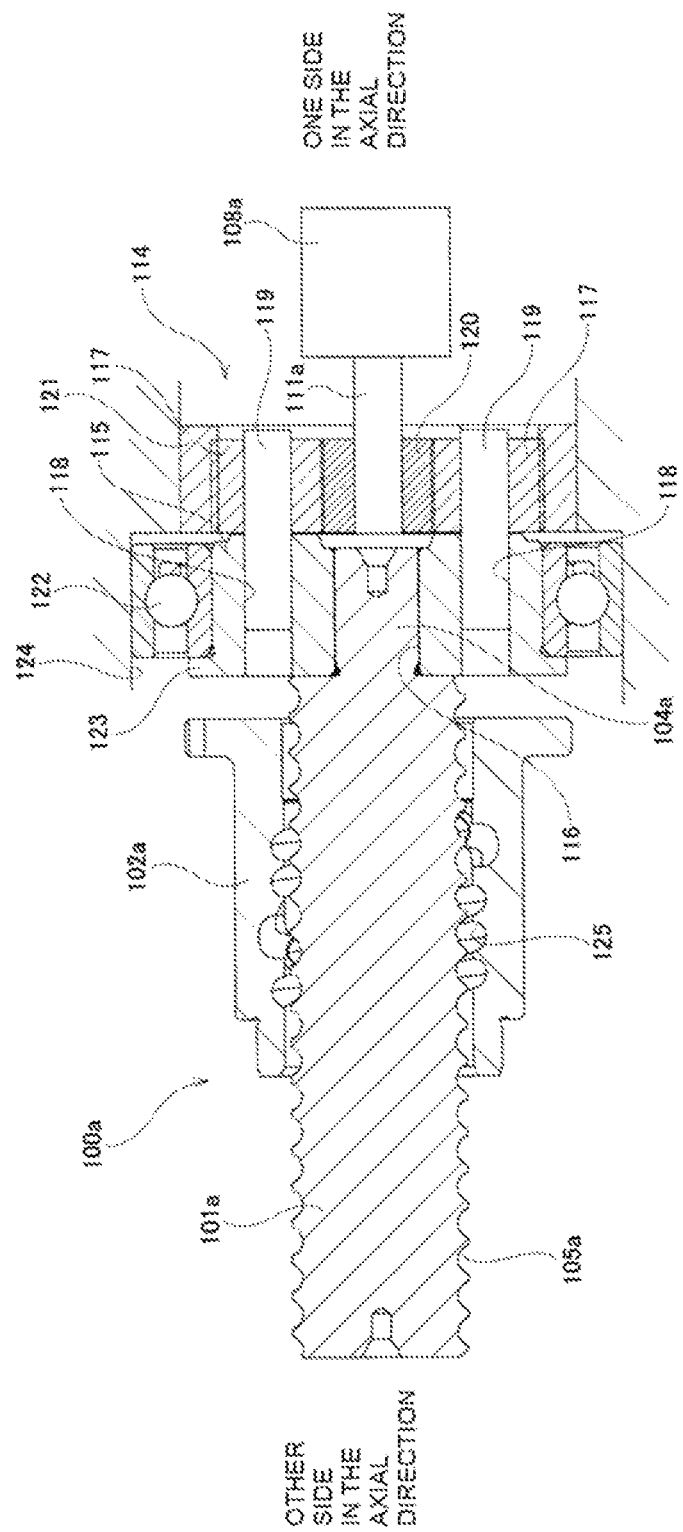

FIG. 12 is a cross-sectional view illustrating a ball screw device having an undisclosed structure in which a ball screw device and a planetary speed-reducing mechanism are combined.

FIRST EXAMPLE

FIG. 1 to FIG. 4 illustrate a ball screw device 1 of a first example of an embodiment of the present disclosure and an example of a structure in which the ball screw device 1 and a planetary speed-reducing mechanism 8 are combined.

[Overall Configuration of Ball Screw Device]

The ball screw device 1 of this example can be incorporated in, for example, an electric brake booster device and used for converting rotational motion of an electric motor, which is a drive source, into linear motion of a piston of a hydraulic cylinder.

The ball screw device 1 includes a screw shaft 2, a nut 3, a plurality of balls 4, and a rolling bearing 5.

The screw shaft 2 is a rotational motion element that is rotationally driven by an electric motor 6, which is a drive source, through a planetary speed-reducing mechanism 7, and undergoes rotational motion during use. The screw shaft 2 is inserted inside the nut 3 and arranged coaxially with the nut 3. The nut 3 is a linear motion element that is prevented from co-rotating with respect to the screw shaft 2 by a rotation-locking mechanism (not illustrated), and undergoes linear motion during use. That is, the ball screw device 1 of this example is used in an aspect in which the screw shaft 2 is rotationally driven and the nut 3 is linearly moved.

A load path 8 having a spiral shape is provided between an outer peripheral surface of the screw shaft 2 and an inner peripheral surface of the nut 3. The plurality of balls 4 is rotatably arranged in the load path 8. When the screw shaft 2 and the nut 3 are relatively rotated, the balls 4 that have reached an end point of the load path 8 are returned to a start point of the load path 8 through a circulation groove 9 formed on the inner peripheral surface of the nut 3.

Next, the structure of each component of the ball screw device 1 will be described below. In the following description, axial direction, radial direction, and circumferential direction refer to the axial direction, radial direction, and circumferential direction with respect to the screw shaft 2, unless otherwise specified. In addition, one side in the axial direction refers to the right side in FIGS. 1 to 3, and the other side in the axial direction refers to the left side in FIGS. 1 to 3.

<Screw Shaft>

The screw shaft 2 is made of metal, and has a screw portion 10 and a carrier 11 of the planetary speed-reducing mechanism 7 adjacently arranged on the one side in the axial direction of the screw portion 10. The screw portion 10 and the carrier 11 are coaxially arranged and integrally formed with each other. The carrier 11 has a substantially disk shape and has an outer diameter larger than the screw portion 10 having a substantially column shape. Therefore, the screw shaft 2 has a substantially T-shaped cross-sectional shape with respect to the axial direction.

The screw portion 10 has a shaft-side ball screw groove 12 having a spiral shape on an outer peripheral surface thereof. The shaft-side ball screw groove 12 is formed by an infeed rolling process. In this example, the number of threads of the shaft-side ball screw groove 12 is one. The cross-sectional groove shape (groove bottom shape) of the shaft-side ball screw groove 12 is a gothic arch groove or a circular arc groove. The screw portion 10 has a bottomed screw-side center hole 13 in the central portion in the radial direction of an end surface on the other side in the axial direction thereof.

In this example, the screw portion 10 has an incomplete screw portion 38 at the end portion on the one side in the axial direction of the outer peripheral surface thereof, in which the shaft-side ball screw groove 12 with a complete groove bottom shape is not formed. The incomplete screw portion 38 has a groove depth which is shallower than that of the shaft-side ball screw groove 12. Specifically, the groove depth of the incomplete screw portion 38 gradually becomes shallower as going toward the one side in the axial direction. The space around the incomplete screw portion 38 can be used as a storage space for peripheral components.

The carrier 11 has an inner ring raceway 14 of the rolling bearing 5. Specifically, the inner ring raceway 14 is formed directly in the intermediate section in the axial direction (central portion in this example) of the outer peripheral surface of the carrier 11. As a result, the carrier 11 functions not only as a component of the planetary speed-reducing mechanism 7 but also as an inner ring of the rolling bearing 5. In other words, in this example, the carrier and the inner ring of the rolling bearing are integrally formed. In this example, since the rolling bearing 5 is constructed by a four-point contact ball bearing capable of supporting a radial load and an axial load in both directions, the inner ring raceway 14 is constructed by a compound curved surface having a gothic arch shape in cross section.

In this example, portions of the outer peripheral surface of the carrier 11 that are deviated from the inner ring raceway 14 on both sides in the axial direction are formed into a partially cylindrical surface shape. However, it is also possible to form seal concave grooves over the entire circumference in portions on both sides in the axial direction of the outer peripheral surface of the carrier with which an end portion on the inner diameter side of a seal ring, which is an optional element for sealing the rolling bearing, is brought into sliding contact.

The carrier 11 has support holes 15 for the pinion pins 33 of the planetary speed-reducing mechanism 7 to be inserted through and supported by at a plurality of locations (three locations in this example) in the circumferential direction of the intermediate portion in the radial direction. The plurality of support holes 15 is arranged so as to be uniformly spaced in the circumferential direction. Further, the center axes of the plurality of support holes 15 are arranged parallel to each other. Each of the support holes 15 is configured by a through hole that penetrates the carrier 11 in the axial direction. That is, the support holes 15 are open not only on the side surface on the one side in the axial direction of the carrier 11, but also on the side surface on the other side in the axial direction of the carrier 11. However, the support holes can also be configured by bottomed holes that are open only on the side surface on the one side in the axial direction of the carrier.

The inner diameter of the support holes 15 is constant along the axial direction. In this example, the diameter of an imaginary circle (diameter of the inscribed circle) passing through end portions on the inside in the radial direction of the plurality of support holes 15 is approximately the same as the outer diameter of the screw portion 10. Also, the diameter of an imaginary circle passing through end portions on the outside in the radial direction of the plurality of support holes 15 is slightly smaller than the outer diameter of the nut 3.

The carrier 11 has a projecting portion 16 in the intermediate portion in the radial direction including opening portions of the plurality of support holes 15 of the side surface on the one side in the axial direction thereof, the projecting portion 16 protruding toward the one side in the axial direction more than portions which are located on the outer and inner sides thereof. The projecting portion 16 has an annular shape that is continuous in the circumferential direction. The inner diameter of the projecting portion 16 is smaller than the diameter of the diameter of an imaginary cylindrical surface passing through a groove bottom portion of the shaft-side ball screw groove 12. The outer diameter of the projecting portion 16 is larger than the outer diameter of the nut 3 and is smaller than the outer diameter of a groove bottom portion of the inner ring raceway 14. A side surface (tip end surface) on the one side in the axial direction of the projecting portion 16 is a flat surface that exists on an imaginary flat plane orthogonal to the center axis of the carrier 11.

The projecting portion 16 and the portion of the side surface on the one side in the axial direction of the carrier 11 that is located on the outer side in the radial direction of the projecting portion 16 are connected by an outer diameter side connecting surface 17 inclined in a direction in which the outer diameter increases as going toward the other side in the axial direction. Also, the projecting portion 16 and the portion of the side surface on the one side in the axial direction of the carrier 11 that is located on the inner side in the radial direction of the projecting portion 16 are connected by an inner diameter side connecting surface 18 inclined in a direction in which the inner diameter decreases as going toward the other side in the axial direction.

The side surface on the other side in the axial direction of the carrier 11 is a flat surface existing on an imaginary flat plane orthogonal to the center axis of the carrier 11.

The carrier 11 has a bottomed carrier-side center hole 19 in the central portion in the radial direction of the side surface on the one side in the axial direction. The carrier-side center hole 19 and the screw-side center hole 13 provided in the screw portion 10 are arranged so as to be coaxial with each other.

The carrier 11 is subjected to induction hardening treatment and tempering treatment on the outer peripheral surface on which the inner ring raceway 14 is formed, and a heat-treated hardened layer is formed thereon. However, the heat-treated hardened layer is not formed on the side surface on the one side in the axial direction and the side surface on the other side in the axial direction of the carrier 11.

The screw shaft 2 is arranged coaxially with the nut 3 in a state where the screw portion 10 is inserted through the inside of the nut 3. In this example, the screw shaft 2 is configured by the screw portion 10 and the carrier 11, but the screw shaft can also be provided with a fitting shaft portion and the like for externally fitting and fixing other members.

<Nut>

The nut 3 is made of a metal and has a cylindrical shape as a whole. The nut 3 has a nut-side ball screw groove 20 having a spiral shape and a circulation groove 9 on the inner peripheral surface thereof.

The nut-side ball screw groove 20 is formed by subjecting the inner peripheral surface of the nut 3 to, for example, a grinding process, a cutting process, a rolling process, or a cutting and tapping process. The nut-side ball screw groove 20 has the same lead as the shaft-side ball screw groove 12. Therefore, in a state in which the screw portion 10 of the screw shaft 2 is inserted inside the nut 3, the shaft-side ball screw groove 12 and the nut-side ball screw groove 20 are arranged so as to face each other in the radial direction to form the spiral-shaped load path 8. The number of threads of the nut-side ball screw groove 20 is one, similar to the shaft-side ball screw groove 12. The cross-sectional groove shape of the nut-side ball screw groove 20 is also a gothic arch groove or a circular arc groove, similar to that of the shaft-side ball screw groove 12.

The circulation groove 9 has a substantially S-shape and is formed on the inner peripheral surface of the nut 3 by cold forging, for example. The circulation groove 9 smoothly connects axially adjacent portions of the nut-side ball screw groove 20, and connects the start point and the end point of the load path 8. Therefore, the balls 4 that have reached the end point of the load path 8 are returned to the start point of the load path 8 through the circulation groove 9. Therefore, the balls 4 that have reached the end point of the load path 8 are returned to the start point of the load path 8 through the circulation means 9. Note that the start point and end point of the load path 8 are interchanged according to the relative displacement direction (relative rotation direction between the screw shaft 2 and the nut 3) in the axial direction between the screw shaft 2 and the nut 3.

The circulation groove 9 has a substantially semicircular cross-sectional shape. The circulation groove 9 has a groove width slightly larger than the diameter of the balls 4, and has a groove depth that allows the balls 4 moving in the circulation groove 9 to climb over the thread peaks of the shaft-side ball screw groove 12.

Figure 3:
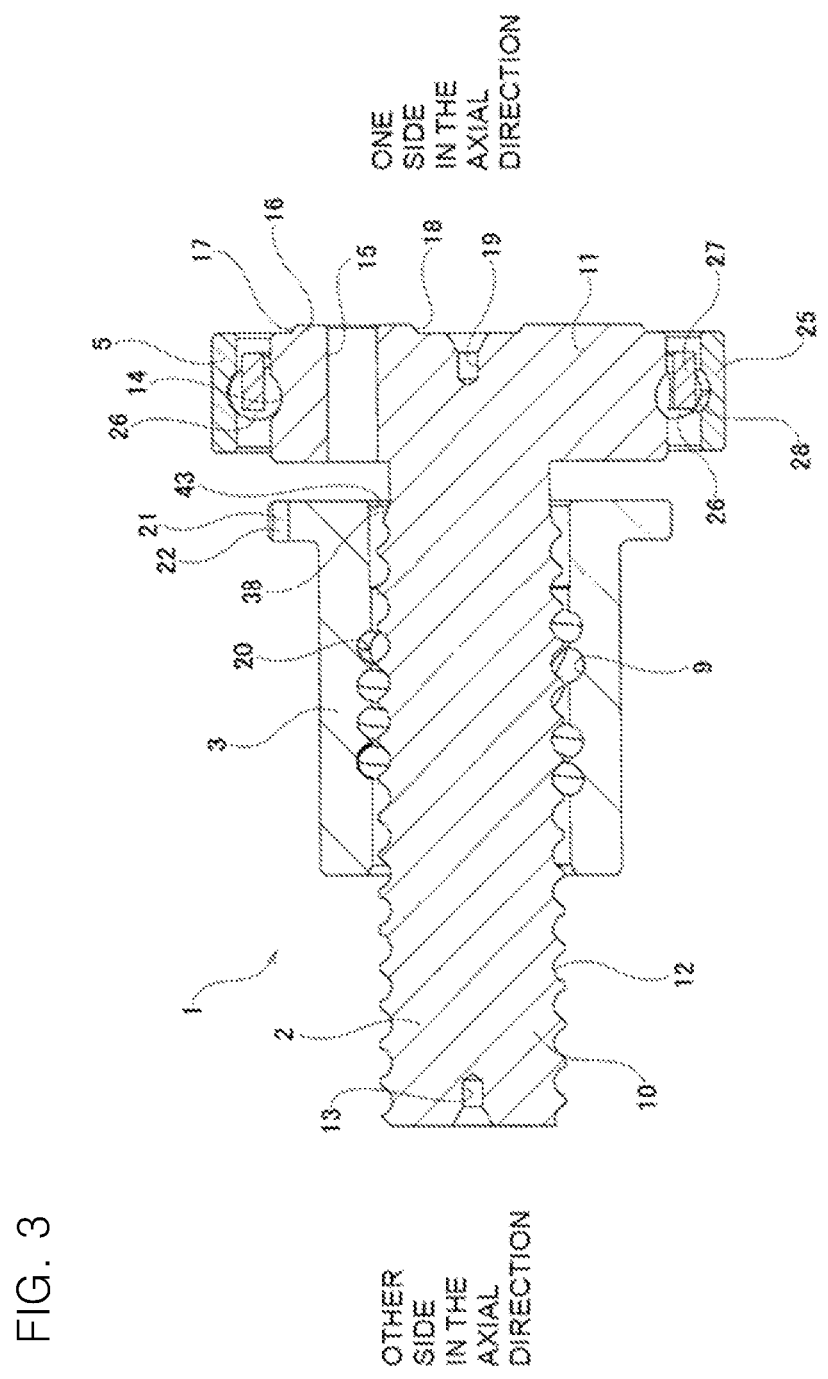
FIG. 3 is a cross-sectional view of the ball screw device of the first example, illustrating a state in which the nut is relatively moved to one side in the axial direction with respect to the screw shaft.
Figure 4:
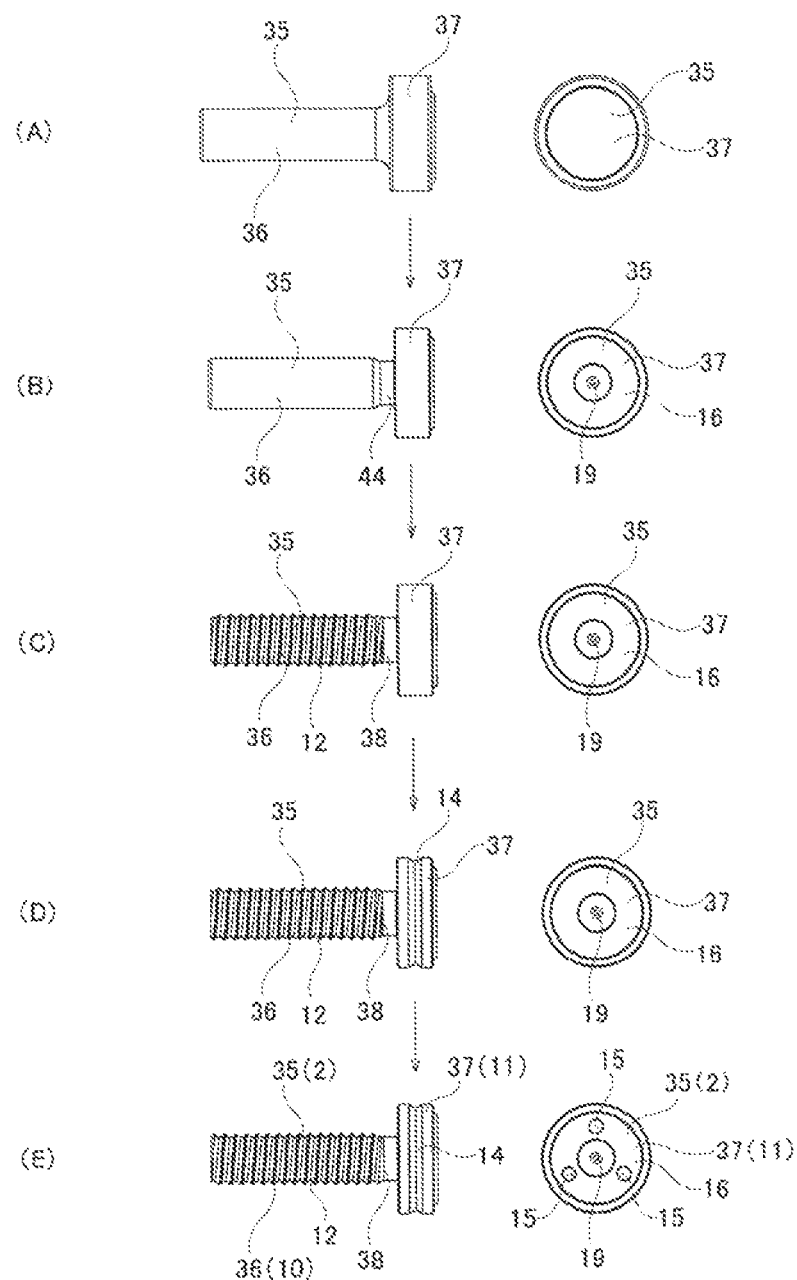

The nut 3 has a cylindrical surface portion 43 in which the nut-side ball screw groove 20 is not formed at an end portion on the one side in the axial direction of the inner peripheral surface. Therefore, in this example, as illustrated in FIG. 3, the cylindrical surface portion 43 can be arranged around the incomplete screw portion 38 of the screw shaft 2 when the nut 3 is moved to the one side in the axial direction relative to the screw shaft 2. As a result, the balls 4 are prevented from being caught between the incomplete screw portion 38 and the nut-side ball screw groove 20, thereby increase in the driving torque of the screw shaft 2 is prevented.

In this example, as illustrated in FIG. 2, the distance La from an end portion on the one side in the axial direction of the nut-side ball screw groove 20 to a side surface on the one side in the axial direction of the nut 3 is made larger than the distance Lb from the boundary between the incomplete screw portion 38 and the shaft-side ball screw groove 12 to the side surface on the other side in the axial direction of the carrier 11 (La>Lb). As a result, even when the nut 3 is displaced to the one side in the axial direction relatively to the screw shaft 2 until the side surface on the one side in the axial direction of the nut 3 comes close to the side surface on the other side in the axial direction of the carrier 11, the balls 4 are securely positioned between the nut-side ball screw groove 20 and the shaft-side ball screw groove 12, and thereby the balls 4 are prevented from being caught between the incomplete screw portion 38 and the nut-side ball screw groove 20.

The nut 3 has an outward flange portion 21 at an end portion on the one side in the axial direction of the outer peripheral surface located on the outside in the radial direction of the cylindrical surface portion 43. The flange portion 21 is provided with engagement grooves 22 at a plurality of locations in the circumferential direction (three locations in this example) that engage with rotation-locking members (not illustrated) provided on fixed members such as the housing 23 to prevent the nut 3 from co-rotating. However, as a rotation-locking mechanism for preventing the nut from rotating, various types of conventionally known structures can be adopted. For example, a structure in which protruding portions (keys) provided on the inner peripheral surface of fixed members such as the housing are engaged with concave grooves formed on the outer peripheral surface of the nut in the axial direction can be adopted.

Further, it is also possible to form a small-diameter portion at the end portion on the other side in the axial direction of the outer peripheral surface of the nut 3 which has an outer diameter smaller than that of the portion adjacent to the one side in the axial direction. In this case, a fitting cylinder such as a piston (not illustrated) can be fitted on and fixed to the small-diameter portion.

<Balls>

The balls 4 are steel balls having a predetermined diameter, and are arranged in the load path 8 and the circulation groove 9 so as to be able to roll. The balls 4 arranged in the load path 8 roll while being subjected to a compressive load, whereas the balls 4 arranged in the circulation groove 9 are pushed by the succeeding balls 4 and roll without being subjected to a compressive load.

<Rolling Bearing>

The rolling bearing 5 supports the carrier 11 of the screw shaft 2 so as to be able to rotate freely with respect to the housing 23, and supports the axial force transmitted to the carrier 11 by the housing 23. In this example, the rolling bearing 5 is configured by a four-point contact ball bearing capable of supporting a radial load and an axial load in both directions. However, as a rolling bearing, it is possible to use any single or double row bearing capable of supporting radial load and axial load. For example, multi-contact ball bearings other than four-point contact ball bearings such as three-contact ball bearings, single-row deep groove ball bearings, double-row deep groove ball bearings, double-row angular contact ball bearings, tapered rolling bearings, and double-row tapered roller bearings can be used.

The rolling bearing 5 includes an outer ring 25, an inner ring raceway 14, a plurality of rolling bodies 26, and a cage 27.

The outer ring 25 has an annular shape, and has an outer ring raceway 28 in the middle section in the axial direction of the inner peripheral surface. The outer ring 25 is fitted and fixed inside the housing 23 and does not rotate during use. In this example, by forming the projecting portion 16 on the side surface on the one side in the axial direction of the carrier 11, a side surface on the one side in the axial direction of the outer ring 25 is offset from the side surface on the one side in the axial direction of the carrier 11 (side surface on the one side in the axial direction of the projecting portion 16) toward the other side in the axial direction. Further, the width dimension in the axial direction of the outer ring 25 is made smaller than the width dimension in the axial direction of the carrier 11. Furthermore, since the rolling bearing 5 is constructed by a four-point contact ball bearing, the outer ring raceway 36 is constructed by a compound curved surface having a gothic arch shape in cross section. Here, it is also possible to provide a retaining ring that is engaged with a portion of the inner peripheral surface of the housing 23 that is deviated in the axial direction from the portion where the outer ring 25 is internally fitted so as to prevent the outer ring 25 from coming off. Further, the side surface on the one side in the axial direction of the outer ring 25 can be arranged on the same plane as the side surface on the one side in the axial direction of the carrier 11, or can be offset to the one side in the axial direction from the side surface on the one side in the axial direction of the carrier 11.

In this example, portions of the inner peripheral surface of the outer ring 25 that are deviated from the outer ring raceway 28 in the axial direction are formed in a partially cylindrical surface shape. However, it is also possible to form locking grooves over the entire circumference in the portions on both sides in the axial direction of the inner peripheral surface of the outer ring to which an end portion on the outer diameter side of a seal ring for sealing the rolling bearing is locked.

In this example, the inner ring raceway 14 of the rolling bearing 5 is formed directly in the intermediate section in the axial direction of the outer peripheral surface of the carrier 11 that face the outer ring raceway 28 in the radial direction, and the inner ring is omitted.

The plurality of rolling bodies 26 are made of steel or ceramics, and are arranged so as to be uniformly spaced in the circumferential direction between the outer ring raceway 28 and the inner ring raceway 14. In this example, balls are used as the rolling bodies 26.

The cage 27 has an annular shape, and has pockets 29 at equal intervals in the circumferential direction. The rolling bodies 26 are held inside the pockets 29 so as to be able to roll freely.

[Planetary Speed-Reducing Mechanism]

In this example, a planetary speed-reducing mechanism 7 is used in order to transmit the rotation of the electric motor 6 to the screw shaft 2 of the ball screw device 1. The planetary speed-reducing mechanism 7 includes a sun gear 30, a plurality of planetary gears 31, a ring gear 32, a carrier 11, and pinion pins 33.

The sun gear 30 is fixed to a tip end portion of the motor shaft (sun gear shaft) 34 of the electric motor 6. The ring gear 32 is arranged so as to be coaxial with the sun gear 30 and is fitted and fixed inside the housing 23. The housing 23 may have a split structure, and a portion into which the ring gear 32 is fitted and a portion into which the outer ring 25 of the rolling bearing 5 is fitted may be configured by separate members.

A plurality of (three in this example) planetary gears 31 are arranged so as to be uniformly spaced in the circumferential direction and supported so as to be able to rotate freely with respect to the carrier 11. Specifically, half portions on the other side in the axial direction of the pinion pins 33 are press-fitted into the support holes 15 formed in the carrier 11, and half portions on the one side in the axial direction of the pinion pins 33 protrude from the support holes 15 to the one side in the axial direction. The planetary gears 31 are supported around the half portions on the one side in the axial direction of the pinion pins 33 through a sliding bearing or needle bearing (C&R) (not illustrated) so as to be able to rotate freely.

A method for fixing the pinion pins to the support holes is not particularly limited, and a fixing structure using swaging, locking pins, or the like may be adopted. Also, as a configuration in which the end portions on the one side in the axial direction of the pinion pins are supported by a second carrier having an annular shape (not illustrated), it is possible to adopt a structure that supports the pinon pins on both sides. Further, the number of planetary gears is not limited to three, and may be two or four or more.

The planetary gears 31 engage with the sun gear 30 and the ring gear 32 respectively.

[Explanation of Operation of Ball Screw Device]

In the ball screw device 1 of this example, the nut 3 is linearly moved by rotationally driving the screw shaft 2 through the planetary speed-reducing mechanism 7 by the electric motor 6 which is the drive source. Specifically, when the electric motor 6 is energized and the sun gear 30 is rotated in a predetermined direction, the planetary gears 31 revolve around the sun gear 30 while rotating. Then, the revolving motion of the planetary gears 31 is transmitted to the screw shaft 2 through the carrier 11 and rotationally drives the screw shaft 2 in a predetermined direction, so that the nut 3 is linearly moved. For example, when the sun gear 30 is rotationally driven toward one side in the circumferential direction, the nut 3 moves to the one side in the axial direction relative to the screw shaft 2, and when the sun gear 30 is rotationally driven toward the other side in the circumferential direction, the nut 3 is moved to the other side in the axial direction relative to the screw shaft 2.

With the ball screw device 1 of this example, it is possible to rotationally drive the screw shaft 2 through the planetary speed-reducing mechanism 7 by the electric motor 6 which is the drive source. A stroke end associated with the nut 3 moving to the one side in the axial direction and to the other side in the axial direction relative to the screw shaft 2 can be restricted using various conventionally known stroke limiting mechanisms.

[Manufacturing Method of Screw Shaft]

The screw shaft 2 of the ball screw device 1 of this example can be manufactured, for example, by a manufacturing method including the following processes. In this example, in addition to the forging process and the rolling process, a first cutting/grinding process, a raceway groove cutting process, a heat treatment process, and a second cutting/grinding process are included as optional and additional processes.

<Forging Process>

A forging process is a process of forming an intermediate material integrally comprising a disk portion and a shaft-shaped portion and having a T-shaped cross-sectional shape with respect to the axial direction by performing a forging process to a raw material. In this example, a raw material (billet) made of metal (not illustrated) is subjected to a hot forging process to form an intermediate material 35 as illustrated in FIG. 4(A). The intermediate material 35 integrally comprises a shaft-shaped portion 36 having a column shape that will be processed into the screw portion 10 and a disk portion 37 that will be processed into the carrier 11, and has a T-shaped cross-sectional shape with respect to the axial direction. Here, in the forging process, it is also possible to roughly form a concave groove having a shape similar to the inner ring raceway 14 on the outer peripheral surface of the disk portion 37.

<First Cutting Process>

In this example, after the forging process and before the rolling process, a process is provided to form the carrier-side center hole 19 on a side surface on the one side in the axial direction of the disk portion 37 and the screw-side center hole 13 on a side surface on the other side in the axial direction of the shaft-shaped portion 36 so as to be coaxial with the carrier-side center hole 19. In this process, a cutting process is performed on the intermediate material 35. Specifically, a cutting process is performed on the outer peripheral surface and the end surface on the other side in the axial direction of the shaft-shaped portion 36, and the side surface on the one side in the axial direction of the disk portion 37. As a result, oxide films formed on the outer peripheral surface and the end surface on the other side in the axial direction of the shaft-shaped portion 36, and on the side surface on the one side in the axial direction of the disk portion 37 are removed, and the shape of each portion is adjusted. In addition, a grinding process can be performed on these surfaces as necessary. Further, as illustrated in FIG. 4(B), a small-diameter portion 44 having an outer diameter smaller than the outer diameter of a portion of the shaft-shaped portion 36 deviating from the end portion on the one side in the axial direction is formed at the end portion on the one side in the axial direction of the shaft-shaped portion 36, and a screw-side center hole 13 is formed in the end surface on the other side in the axial direction of the shaft-shaped portion 36. The outer peripheral surface of the small-diameter portion 44 becomes the incomplete screw portion 38 in the state where the screw shaft 2 is completed.

Further, the projecting portion 16 and the carrier-side center hole 19 are formed on a side surface on the one side in the axial direction of the disk portion 37. In this example, the screw-side center hole 13 and the carrier-side center hole 19 are formed so as to be coaxial with each other. The small-diameter portion 44 can also be formed at an end portion on the one side in the axial direction of the outer peripheral surface of the shaft-shaped portion 36 in the forging process.

<Rolling Process>

A rolling process is a process of forming the shaft-side ball screw groove 12 on the outer peripheral surface of the shaft-shaped portion 36 by performing an infeed rolling process to the intermediate material 35. In this example, as illustrated in FIG. 4(C), the shaft-side ball screw groove 12 having a spiral shape is formed on a portion of the outer peripheral surface of the shaft-shaped portion 36 that is deviated from the small-diameter portion 44 by performing an infeed rolling process to the intermediate material 35. Since the cross-sectional shape of the intermediate material 35 in the axial direction is T-shaped, it is difficult to perform a through-feed type rolling process to the intermediate material 35. In this example, the shaft-side ball screw groove 12 is formed on the outer peripheral surface of the shaft-shaped portion 36 by bringing a pair of rolling dies close to each other with respect to the shaft-shaped portion 36 by the infeed rolling process.

In this example, such an infeed rolling process is performed in a state where the intermediate material 35 is centered using the screw-side center hole 13 and the carrier-side center hole 19. Further, in this process, the incomplete screw portion 38 is formed on the outer peripheral surface of the small-diameter portion 44 of the shaft-shaped portion 36. In this example, since the small-diameter portion 44 is provided at an end portion on the one side in the axial direction of the outer peripheral surface of the shaft-shaped portion 36, excess thickness can be released to the small-diameter portion 44 side when the shaft-side ball screw groove 12 is formed by performing an infeed rolling process. As a result, the shape and dimensions of the shaft-side ball screw groove 12 can be stabilized.

<Raceway Groove Cutting Process>

In this example, a raceway groove cutting process is provided after the rolling process. The raceway groove cutting process is a process of performing a cutting process on the outer peripheral surface of the disk portion 37 to form the inner ring raceway 14. In this example, the inner ring raceway 14 is formed in the middle section in the axial direction of the outer peripheral surface of the disk portion 37 as illustrated in FIG. 4(D) by performing a cutting process on the outer peripheral surface of the disk portion 37. Further, the cutting process for forming the inner ring raceway 14 is performed with the intermediate material 35 centered using the screw-side center hole 13 and the carrier-side center hole 19. When a concave groove is roughly formed on the outer peripheral surface of the disk portion 37 in the forging process, the inner ring raceway 14 is formed by adjusting the shape of the concave groove in the raceway groove cutting process. Note that the rolling process may be performed after the raceway groove cutting process.

<Heat Treatment Process>

In this example, a heat treatment process is provided after the rolling process and the raceway groove cutting process. The heat treatment process is a step of forming a heat-treated hardened layer in a range including the outer peripheral surface of the disk portion 37 and the outer peripheral surface of the shaft-shaped portion 36. In this example, by performing a heat treatment on the intermediate material 35, a heat-treated hardened layer is formed at least on a portion of the outer peripheral surface of the shaft-shaped portion 36 where the shaft-side ball screw groove 12 is formed and on a portion of the outer peripheral surface of the disk portion 37 where the inner ring raceway 14 is formed.

Specifically, the outer peripheral surface of the shaft-shaped portion 36 and the outer peripheral surface of the disk portion 37 are subjected to induction hardening treatment and tempering treatment, and the side surface in the axial direction of the disk portion 37 (the side surface on the one side in the axial direction and the side surface on the other side in the axial direction thereof) is not subjected to induction hardening treatment and tempering treatment. As a result, a heat-treated hardened layer is formed only the portion of the outer peripheral surface of the shaft-shaped portion 36 where the shaft-side ball screw groove 12 is formed and the portion of the outer peripheral surface of the disk portion 37 where the inner ring raceway 14 is formed, and the side surface in the axial direction of the disk portion 37 is prevented from being deformed by heat treatment. As a quenching treatment, sub-quenching, carburizing quenching, or the like can be employed other than induction hardening.

<Second Cutting/Grinding Process>

In this example, after the rolling process, the raceway groove cutting process, and the heat treatment process, a step of forming the support holes 15 at a plurality of locations in the circumferential direction of the central portion in the radial direction of the disk portion 37 is provided for inserting and supporting the pinion pins 33 of the planetary speed-reducing mechanism 7. Specifically, as illustrated in FIG. 4(E), the support holes 15 are formed by performing a drilling process at a plurality of locations in the circumferential direction of the intermediate portion in the radial direction of the disk portion 37. In this example, since induction hardening treatment and tempering treatment are not performed on the side surface in the axial direction of the disk portion 37 in the heat treatment process as a previous step, no heat treatment deformation occurs on the side surface in the axial direction of the disk portion 37. As a result, it is possible to perform a drilling process to the intermediate portion in the radial direction of the disk portion 37 without performing a removal process to remove deformed portions due to the heat treatment. Further, since the intermediate portion in the radial direction of the disk portion 37 has the same hardness as the raw material, the drilling process can be easily performed.

In this step, a grinding process is performed on the inner ring raceway 14 formed on the outer peripheral surface of the disk portion 37. In this example, the cutting process (drilling process) for forming the support holes 15 and the grinding process to the inner ring raceway 14 are respectively performed in a state where the intermediate material 35 is centered by using the screw-side center hole 13 and the carrier-side center hole 19. In the heat treatment process, when the intermediate material 35 is subjected to sub-quenching or carburizing quenching, the hardness of the side surface in the axial direction of the disk portion 37 also increases, but it is possible to perform a drilling process to the intermediate portion in the radial direction of the disk portion 37.

In this example, the screw shaft 2 is obtained from the intermediate material 35 by forming the screw portion 10 from the shaft-shaped portion 36 and forming the carrier 11 from the disk portion 37 through the manufacturing processes described above.

In the ball screw device 1 of this example, in spite of adopting a structure in which the screw shaft 2 is rotationally driven using the planetary speed-reducing mechanism 7, the number of components is suppressed and the assembling efficiency is improved.

That is, in this example, since the inner ring raceway 14 constituting the rolling bearing 5 is directly formed on the outer peripheral surface of the carrier 11, it is possible to omit the inner ring constituting the rolling bearing 5. As a result, compared to a structure in which an inner ring, which is separated from the carrier, is externally fitted and fixed to the carrier, as the structure illustrated in FIG. 12, the number of components is suppressed, the number of assembling steps is reduced, and the assembling efficiency is improved. Also, in this example, it is not necessary to form a flange portion for transmitting axial force to the outer peripheral surface of the carrier 11, and the number of processing steps can be reduced accordingly. Further, in this example, since the carrier 11 does not require a flange portion, it is sufficient to form a heat-treated hardened layer only on the outer peripheral surface including the inner ring raceway 14. Accordingly, when performing a drilling process to the side surface in the axial direction of the carrier 11 to form support holes 15, it is not necessary to perform a removal process to remove the heat-treated hardened layer, and the number of processing steps can be reduced accordingly.

In this example, since the screw portion 10 and the carrier 11 are also integrally configured, the number of components can be reduced and the number of assembling steps can be reduced compared to a case of adopting a structure in which a carrier separate from a screw shaft is fixed to the screw shaft. Further, since the coaxiality between the screw portion 10 and the carrier 11 can be increased, it is possible to improve quietness of the ball screw device 1 during operation.

In this example, since the side surface on the one side in the axial direction of the outer ring 25 is offset from the side surface on the one side in the axial direction of the carrier 11 toward the other side in the axial direction, it is possible to prevent interference between the side surface on the one side in the axial direction of the outer ring 25 and an end surface on the other side in the axial direction of the planetary gears 31. Further, a projecting portion 16 having a flat-surface shaped side surface on the one side in the axial direction is formed in the intermediate portion in the radial direction of the side surface on the one side in the axial direction of the carrier 11 including the opening portions of the support holes 15. Therefore, it is possible to prevent the planetary gears 31 from moving to the other side in the axial direction by using the side surface on the one side in the axial direction of the projecting portion 16. Further, even when side surfaces on the other side in the axial direction of the planetary gears 31 are brought into sliding contact with the side surface on the one side in the axial direction of the projecting portion 16, it is possible to prevent sliding resistance from becoming excessive. In this example, although the side surfaces on the other side in the axial direction of the planetary gears 31 and the side surface on the one side in the axial direction of the projecting portion 16 are in direct contact with each other, other members such as a sliding washer may be interposed between the side surfaces on the other side in the axial direction of the planetary gears 31 and the side surface on the one side in the axial direction of the projecting portion 16.

In this example, when manufacturing the screw shaft 2, the shaft-side ball screw groove 12, the inner ring raceway 14, and the support holes 15 can be machined using the same (common) reference such as the screw-side center hole 13 and the carrier-side center hole 19. As a result, the dimensional accuracy of the screw shaft 2 can be improved. Accordingly, the mechanical efficiency of the ball screw device 1 can be improved, and the meshing accuracy between the planetary gears 31 and the sun gear 30 and the meshing accuracy between the planetary gears 31 and the ring gear 32 can be improved respectively.

In this example, since the carrier 11 is supported by using the rolling bearing 5 so as to be able to rotate freely with respect to the housing 23, it is possible to support the axial force transmitted to the carrier 11 by the housing 23 through the rolling bearing 5. Specifically, it is possible to prevent an axial reaction force acting on the screw shaft 2 from the nut 3 through the balls 4 from being transmitted to an engaging portion between the planetary gears 31 and the sun gear 30 and an engaging portion between the planetary gears 31 and the ring gear 32. Further, even if an axial force acts on the carrier 11 due to the fact that helical gears are used as the planetary gears 31 for reasons such as securing performance reducing noise and vibration, since the rolling bearing 5 is provided, it is possible to prevent such axial force from being transmitted to rolling contact portions between the balls 4 and the shaft-side ball screw groove 12 and the nut-side ball screw groove 20.

SECOND EXAMPLE

FIG. 5 and FIG. 6 illustrate a ball screw device of a second example of an embodiment of the present disclosure.

A nut-side ball screw groove 20 is formed on the inner peripheral surface of a nut 3a used in this example to an end portion on the one side in the axial direction. That is, the nut 3a does not include the cylindrical surface portion 43 that the nut 3 includes in the first example.

On the other hand, in this example, a screw shaft 2d includes a tapered concave portion (recessed portion) 45 of which the generatrix shape is inclined in a direction in which the outer diameter becomes smaller as going toward the one side in the axial direction. That is, the screw shaft 2d is provided with the concave portion 45 by removing the incomplete screw portion 38 included in the screw shaft 2 in the first example by a cutting process.

In this example, it is possible to more effectively prevent the balls 4 from being caught between the nut-side ball screw groove 20 and the incomplete screw portion, thereby preventing an increase in the driving torque of the screw shaft 2d. Other configurations and operational effects are the same as in the first example.

THIRD EXAMPLE

FIG. 7 illustrates a ball screw device 1 of a third example of an embodiment of the present disclosure.

In this example, a side surface on the one side in the axial direction of a carrier 11a of a screw shaft 2a is not provided with a projecting portion 16 (see FIG. 2, etc.) provided in the screw shaft 2 in the first example. The side surface on the one side in the axial direction of the carrier 11a is made to be a flat surface that exists on an imaginary flat plane orthogonal to a center axis of the carrier 11a (screw shaft 2a). In this example as well, the side surface on the one side in the axial direction of the outer ring 25 is offset from the side surface on the one side in the axial direction of the carrier 11a toward the other side in the axial direction.

In this example, the width dimension in the axial direction of the carrier 11a (screw shaft 2a) can be shortened. As a result, the size of the ball screw device 1 can be reduced. Other configurations and operational effects are the same as in the first example.

FOURTH EXAMPLE

FIG. 8 illustrates a ball screw device 1 of a fourth example of an embodiment of the present disclosure.

In this example, a carrier 11b of a screw shaft 2b has a carrier hollow portion 39 that is open to a side surface on the one side in the axial direction in a central portion (inner portion) in the radial direction thereof. The carrier hollow portion 39 has a column-shaped inner space. The inner diameter of the carrier hollow portion 39 is constant along the axial direction, and it is smaller than the diameter of an imaginary circle passing through end portions on the inside in the radial direction of the plurality of support holes 15. A bottom surface 40 of the carrier hollow portion 39 is located on the one side in the axial direction of a side surface on the other side in the axial direction of the carrier 11b. However, the inner diameter of the carrier hollow portion may also be varied depending on a position in the axial direction. In other words, the carrier hollow portion may also be configured by a stepped hole.

Further, a screw portion 10a of the screw shaft 2b has a screw hollow portion 41 which is elongated in the axial direction and open to an end surface on the other side in the axial direction in a central portion (inner portion) in the radial direction. The screw hollow portion 41 is arranged coaxially with the carrier hollow portion 39 and has a column-shaped inner space. The inner diameter of the screw hollow portion 41 is constant along the axial direction, and it is smaller than the inner diameter of the carrier hollow portion 39. However, the inner diameter of the screw hollow portion may also be varied depending on a position in the axial direction. In other words, the screw hollow portion may be configured by a stepped hole.

The screw hollow portion 41 is formed over the entire length of the screw portion 10a, and an end portion on the one side in the axial direction of the screw hollow portion 41 reaches a side portion on the other side in the axial direction of the carrier 11b. In this example, the screw hollow portion 41 is open to the bottom surface 40 of the carrier hollow portion 39. As a result, the carrier hollow portion 39 and the screw hollow portion 41 communicate in the axial direction. However, it is also possible to adopt a structure in which the carrier hollow portion and the screw hollow portion do not communicate in the axial direction.

In this example, since the carrier hollow portion 39 is formed in the central portion in the radial direction of the carrier 11b and the screw hollow portion 41 is formed in the central portion in the radial direction of the screw portion 10a, the weight of the screw shaft 2b can be reduced. Further, since the carrier hollow portion 39 and the screw hollow portion 41 communicate in the axial direction, the carrier hollow portion 39 and the screw hollow portion 41 can be used as a passage for passing lubricating oil, air, and the like. Other configurations and operational effects are the same as in the first example.

As in the first example, the carrier hollow portion 39 and the screw hollow portion 41 can be machined after the shaft-side ball screw groove 12, the inner ring raceway 14, and the support holes 15 are machined using the screw-side center hole 13 and the carrier-side center hole 19. In other words, when manufacturing the screw shaft 2b, the carrier hollow portion 39 and the screw hollow portion 41 can be formed after a forging process and before a rolling process by performing a cutting process and a grinding process to the intermediate material 35. However, it is also possible to form the carrier hollow portion 39 and the screw hollow portion 41 by forming a concave portion having a shape similar to that of the carrier hollow portion 39 and a recessed portion having a shape similar to that of the screw hollow portion 41 in the forging process and then adjusting the shapes of the concave portion and the recessed portion by a cutting process.

FIFTH EXAMPLE

FIG. 9 illustrates an example of a structure in which a ball screw device 1 of a fifth example an embodiment of the present disclosure and a planetary speed-reducing mechanism 8 are combined.

In this example, as in the fourth example, a carrier hollow portion 39 is formed in a carrier 11b. However, unlike the fourth example, the screw hollow portion 41 (see FIG. 8) is not formed in the screw portion 10 in this example.

In this example, a tip end portion (end portion on the other side in the axial direction) of the motor shaft 34a of the electric motor 6 is inserted inside the carrier hollow portion 39. Specifically, of the motor shaft 34a, a portion protruding to the other side in the axial direction from the sun gear 30 is inserted inside the carrier hollow portion 39. Further, a radial needle bearing (C&R) 42 is arranged between the outer peripheral surface of the tip end portion of the motor shaft 34a and the inner peripheral surface of the carrier hollow portion 39. As a result, the tip end portion of the motor shaft 34a is supported so as to be able to rotate freely with respect to the carrier 11a by using the radial needle bearing 42. However, instead of the radial needle bearing, it is also possible to use a radial roller bearing, a sliding bearing, or the like.

In this example, the tip end portion of the motor shaft 34a is supported so as to be able to rotate freely with respect to the carrier 11a, so that the motor shaft 34a can be supported on both sides. As a result, coaxiality between the motor shaft 34a and the screw shaft 2c can be increased, and the meshing accuracy between the sun gear 30 and the planetary gears 31 can be increased. Other configurations and operational effects are the same as in the first and the fourth examples.

SIXTH EXAMPLE

FIG. 10 illustrates a ball screw device 1 of a sixth example of an embodiment of the present disclosure.

In this example, a side surface on the one side in the axial direction of a carrier 11c of a screw shaft 2e is a flat surface existing on an imaginary flat plane orthogonal to the center axis of the carrier 11c (screw shaft 2e) similar to the carrier 11a of the third example. Further, in this example, the position in the axial direction of the side surface on the one side in the axial direction of the carrier 11c and the position in the axial direction of the side surface on the one side in the axial direction of the outer ring 25 are aligned. In other words, in this example, the side surface on the one side in the axial direction of the carrier 11c and the side surface on the one side in the axial direction of the outer ring 25 are arranged on the same imaginary flat plane orthogonal to the center axis of the carrier 11c (screw shaft 2e).

Further, in this example, the position in the axial direction of the side surface on the other side in the axial direction of the carrier 11c and the position in the axial direction of the side surface on the other side in the axial direction of the outer ring 25 are aligned. However, the side surface on the other side in the axial direction of the carrier 11c can be offset from the side surface on the other side in the axial direction of the outer ring 25 toward the other side in the axial direction or toward the one side in the axial direction. Other configurations and operational effects are the same as in the first and the third examples.

Embodiments according to the present disclosure have been described above, however, the content of the present disclosure is not limited to this, and can be changed as appropriate without departing from the technical idea of the present disclosure. In addition, the structures of each of the examples of an embodiment of the present disclosure can be combined as appropriate and implemented as long as there is no contradiction.

Although a structure is adopted in which the circulation groove is directly formed on the inner peripheral surface of the nut in each example of an embodiment of the present disclosure, it is also possible to form the circulation groove in a circulation component (for example, a top) separate from the nut and fix the circulation component to the nut.

REFERENCE SIGNS LIST

1 Ball screw device
2, 2a, 2b, 2c, 2d, 2e Screw shaft
3, 3a Nut
4 Balls
5 Rolling bearing
6 Electric motor
7 Planetary speed-reducing mechanism
8 Load path
9 Circulation groove
10, 10a Screw portion
11, 11a, 11b, 11c Carrier
12 Shaft-side ball screw groove
13 Screw-side center hole
14 Inner ring raceway
15 Support holes
16 Projecting portion
17 Outer diameter side connecting surface
18 Inner diameter side connecting surface
19 Carrier-side center hole
20 Nut-side ball screw groove
21 Flange portion
22 Engagement grooves
23 Housing
25 Outer ring
26 Rolling bodies
27 Cage
28 Outer ring raceway
29 Pockets
30 Sun gear
31 Planetary gears
32 Ring gear
33 Pinion pins
34, 34a Motor shaft
35 Intermediate material
36 Shaft-shaped portion
37 Disk portion
38 Incomplete screw portion
39 Carrier hollow portion
40 Bottom surface
41 Screw hollow portion
42 Radial needle bearing
43 Cylindrical surface portion
44 Small-diameter portion
45 Concave portion
100, 100a Ball screw device
101, 101a Screw shaft
102, 102a Nut
103 Screw portion
104, 104a Fitting shaft portion
105, 105a Shaft-side ball screw groove
106 Housing
107 Guide rods
108 Electric motor
109 Pulley device
110 Driven pulley
111 Motor shaft
112 Drive pulley
113 Belt
114 Planetary speed-reducing mechanism
115 Carrier
116 Mounting hole
117 Planetary gears 118 Support holes
119 Pinion pins
120 Sun gear
121 Ring gear
122 Rolling bearing
123 Flange portion
124 Housing
125 Nut-side ball screw groove

The invention claimed is:

1. A ball screw device, comprising:
a screw shaft which has a screw portion having a shaft-side ball screw groove having a spiral shape on an outer peripheral surface thereof; and a carrier constituting a planetary speed-reducing mechanism, integrally configured with the screw portion, and arranged on one side in an axial direction of the screw portion, the screw shaft undergoing rotational motion during use,
a nut which has a nut-side ball screw groove having a spiral shape on an inner peripheral surface thereof, and undergoes linear motion during use,
a plurality of balls arranged between the shaft-side ball screw groove and the nut-side ball screw groove, and
a rolling bearing which has an outer ring having an outer ring raceway on an inner peripheral surface thereof, an inner ring raceway provided on a portion facing the outer ring raceway in a radial direction, and a plurality of rolling bodies arranged between the outer ring raceway and the inner ring raceway so as to be able to roll freely, and supports the carrier so as to be able to rotate freely, wherein
the inner ring raceway is directly formed on an outer peripheral surface of the carrier, the screw portion has an incomplete screw portion at an end portion on the one side in the axial direction on the outer peripheral surface, and
a distance from an end portion on the one side in the axial direction of the nut-side ball screw groove to a side surface on the one side in the axial direction of the nut is greater than a distance from a boundary between the incomplete screw portion and the shaft-side ball screw groove to a side surface on the other side in the axial direction of the carrier.

2. The ball screw device according to claim 1, wherein the screw portion has a tapered concave portion of which a generatrix shape is inclined in a direction in which an outer diameter thereof decreases as going toward the one side in the axial direction at an end portion on the one side in the axial direction of the outer peripheral surface.

3. The ball screw device according to claim 1, wherein a side surface on the one side in the axial direction of the outer ring is offset from a side surface on the one side in the axial direction of the carrier toward the other side in the axial direction.

4. The ball screw device according to claim 1, wherein a width dimension in the axial direction of the carrier is larger than a width dimension in the axial direction of the outer ring.

5. The ball screw device according to claim 1, wherein
the carrier has support holes at a plurality of locations in a circumferential direction of an intermediate portion in the radial direction thereof for inserting and supporting pinion pins constituting the planetary speed-reducing mechanism, and
the support holes are configured by through holes that penetrate the carrier in the axial direction.

6. The ball screw device according to claim 5, wherein the carrier has a projecting portion protruding toward the one side in the axial direction in a portion of the side surface on the one side in the axial direction thereof including opening portions of the support holes.

7. The ball screw device according to claim 6, wherein the projecting portion has an annular shape.

8. A manufacturing method of the screw shaft described in claim 1, comprising
a forging process to form an intermediate material integrally comprising a disk portion and a shaft-shaped portion and having a T-shaped cross-sectional shape by performing a forging process to a raw material, and
a rolling process to form the shaft-side ball screw groove on an outer peripheral surface of the shaft-shaped portion by performing an infeed rolling process to the intermediate material.

9. The manufacturing method of the screw shaft according to claim 8, comprising a raceway groove cutting process to form the inner ring raceway by performing a cutting process to an outer peripheral surface of the disk portion.

10. The manufacturing method of the screw shaft according to claim 8, wherein, after the forging process and before the rolling process, a carrier-side center hole is formed in a side surface on the one side in the axial direction of the disk portion and a screw-side center hole is formed in a side surface on the other side in the axial direction of the shaft-shaped portion so as to be coaxial with the carrier-side center hole.

11. The manufacturing method of the screw shaft according to claim 8, comprising a raceway groove cutting process to form the inner ring raceway by performing a cutting process on an outer peripheral surface of the disk portion, wherein
after the forging process and before the rolling process, a carrier-side center hole is formed on a side surface on the one side in the axial direction of the disk portion and a screw-side center hole is formed on a side surface on the other side in the axial direction of the shaft-shaped portion so as to be coaxial with the carrier-side center hole, and
the rolling process and the cutting process are performed in the rolling process and the raceway groove cutting process in a state where the intermediate material is centered by using the carrier-side center hole and the screw-side center hole.

12. The manufacturing method of the screw shaft according to claim 10, wherein, after the rolling process, a heat-treated hardened layer is formed in a range including the outer peripheral surface of the disk portion and the outer peripheral surface of the shaft-shaped portion, and support holes for inserting and supporting pinion pins constituting the planetary speed-reducing mechanism are subsequently formed at a plurality of locations in a circumferential direction of an intermediate portion in a radial direction of the disk portion in a state where the intermediate material is centered by using the carrier-side center hole and the screw-side center hole.

13. The manufacturing method of the screw shaft according to claim 8, wherein, after the forging process and before the rolling process, a small-diameter portion having an outer diameter smaller than an outer diameter of a portion deviated from an end portion on the one side in the axial direction of the shaft-shaped portion is formed at an end portion on the one side in the axial direction of the shaft-shaped portion.

* * * * *